United States Patent
Huang

(10) Patent No.: US 7,301,765 B2
(45) Date of Patent: Nov. 27, 2007

(54) EXTENDABLE AND RECEIVABLE HEAT-DISSIPATING BASE SET FOR NOTEBOOKS

(76) Inventor: Cheng Yu Huang, 3F, 42, Alley 47, Chanshin Road, Taishan, Taipei (TW)

( * ) Notice: Subject to any disclaimer, the term of this patent is extended or adjusted under 35 U.S.C. 154(b) by 374 days.

(21) Appl. No.: 11/039,794

(22) Filed: Jan. 24, 2005

(65) Prior Publication Data

US 2006/0164806 A1    Jul. 27, 2006

(51) Int. Cl.
*H05K 7/20* (2006.01)
*G06F 1/16* (2006.01)

(52) U.S. Cl. .................. 361/695; 361/687; 454/184

(58) Field of Classification Search .............. 361/690, 361/695, 687; 454/184
See application file for complete search history.

(56) References Cited

U.S. PATENT DOCUMENTS

| | | | | |
|---|---|---|---|---|
| 5,100,098 | A * | 3/1992 | Hawkins | 248/291.1 |
| 5,503,361 | A * | 4/1996 | Kan-O et al. | 248/688 |
| 5,704,212 | A * | 1/1998 | Erler et al. | 62/3.2 |
| 6,084,769 | A * | 7/2000 | Moore et al. | 361/687 |
| 6,094,347 | A * | 7/2000 | Bhatia | 361/695 |
| 6,115,249 | A * | 9/2000 | Cipolla et al. | 361/687 |
| 6,239,971 | B1 * | 5/2001 | Yu et al. | 361/695 |
| 6,256,193 | B1 * | 7/2001 | Janik et al. | 361/683 |
| 6,259,601 | B1 * | 7/2001 | Jaggers et al. | 361/690 |
| 6,266,241 | B1 * | 7/2001 | Van Brocklin et al. | 361/687 |
| 6,414,842 | B1 * | 7/2002 | Cipolla et al. | 361/687 |
| 6,682,040 | B1 * | 1/2004 | MacEachern | 248/349.1 |
| 6,691,197 | B2 * | 2/2004 | Olson et al. | 710/304 |
| 6,707,668 | B2 * | 3/2004 | Huang | 361/687 |
| 6,754,072 | B2 * | 6/2004 | Becker et al. | 361/687 |
| 6,837,057 | B2 * | 1/2005 | Pokharna et al. | 62/3.2 |
| 6,894,896 | B2 * | 5/2005 | Lin | 361/695 |
| 6,966,358 | B2 * | 11/2005 | Rapaich | 165/80.4 |
| D522,002 | S * | 5/2006 | Cheng | D14/439 |
| 7,177,150 | B2 * | 2/2007 | Kazuhiro | 361/695 |
| 2001/0007525 | A1 * | 7/2001 | Tracy | 361/687 |
| 2001/0033475 | A1 * | 10/2001 | Lillios et al. | 361/687 |
| 2002/0018335 | A1 * | 2/2002 | Koizumi | 361/687 |
| 2003/0058615 | A1 * | 3/2003 | Becker et al. | 361/687 |
| 2003/0123223 | A1 * | 7/2003 | Pokharna et al. | 361/687 |
| 2004/0047124 | A1 * | 3/2004 | Hsieh et al. | 361/687 |
| 2005/0083650 | A1 * | 4/2005 | Yang | 361/687 |
| 2005/0174731 | A1 * | 8/2005 | Lin | 361/686 |
| 2005/0213302 | A1 * | 9/2005 | Lin | 361/695 |

* cited by examiner

*Primary Examiner*—Anatoly Vortman
(74) *Attorney, Agent, or Firm*—Troxell Law Office, PLLC

(57) ABSTRACT

An extendable and receivable heat-dissipating base set for notebooks, having heat-dissipating fans provided on both the bottom base and the receivable base thereof is provided. The extending and receiving characteristics of the receiving base allow heat to dissipate when the receiving base is extended, and allows the base set to reduce its size when received. Through the heat-dissipating fan disposed on the bottom base and the receiving base, the notebook can dissipate heat when it is put on top of the base set.

6 Claims, 3 Drawing Sheets

EXTENDABLE AND RECEIVABLE HEAT-DISSIPATING BASE SET FOR NOTEBOOKS

FIELD OF THE INVENTION

Portable computers, or so-called notebooks, in general are characterized in their light weight and small size, and thus are also called "mobile computers" for they are suitable to be carried and used anywhere. However, limited by the size and structure of the notebooks, heat dissipation thereof is less effective than that of personal computers.

If used over a short time, notebooks can usually dissipate heat without problems; however, as use time increases, notebooks can become easily overheated. In addition, since the easily overheated portion of the notebook is located in the back of the notebooks that is closer to the hard drive, the CPU and the power source, overheating notebooks can cause the hard drive or the CPU of the computer to crash and may even endanger the user. Thus, the overheating problem of the notebook cannot be ignored by the suppliers.

In order to overcome the aforesaid heating problem of the notebooks, the suppliers came up with a "heat-dissipating base set" for the notebooks so as to assist heat dissipation. Nonetheless, the heat-dissipating base set for the notebooks in general needs to be customized to accommodate the size of the notebook. As a result, the heat-dissipating base set has a larger size in either two or three dimensions than the size of the notebook causing some inconvenience when the notebook is placed on the table or when it is carried.

Due to the inconvenience of the heat-dissipating base set for the notebooks, the inventor developed an extendable and receivable heat-dissipating base set for notebooks. The invention utilizes the extending and receiving functions of a receiving base so that heat can be effectively dissipated through the heat-dissipating fans provided on the bottom base and the receiving base when the receiving base is extended. In addition, the overall size of the heat-dissipating base set can be reduced when the receiving base is received in the heat-dissipating base set.

SUMMARY OF THE INVENTION

The present invention is an extendable and receivable heat-dissipating base set for notebooks. It is characterized in that a receiving base provides extending and receiving functions. Through the heat-dissipating fans provided on the bottom base and the receiving base, heat can be effectively dissipated when the receiving base is extended. In addition, the overall size of the heat-dissipating base set can be reduced when the receiving base is received in the heat-dissipating base set.

DETAILED DESCRIPTION OF THE EMBODIMENTS

Figure 1:
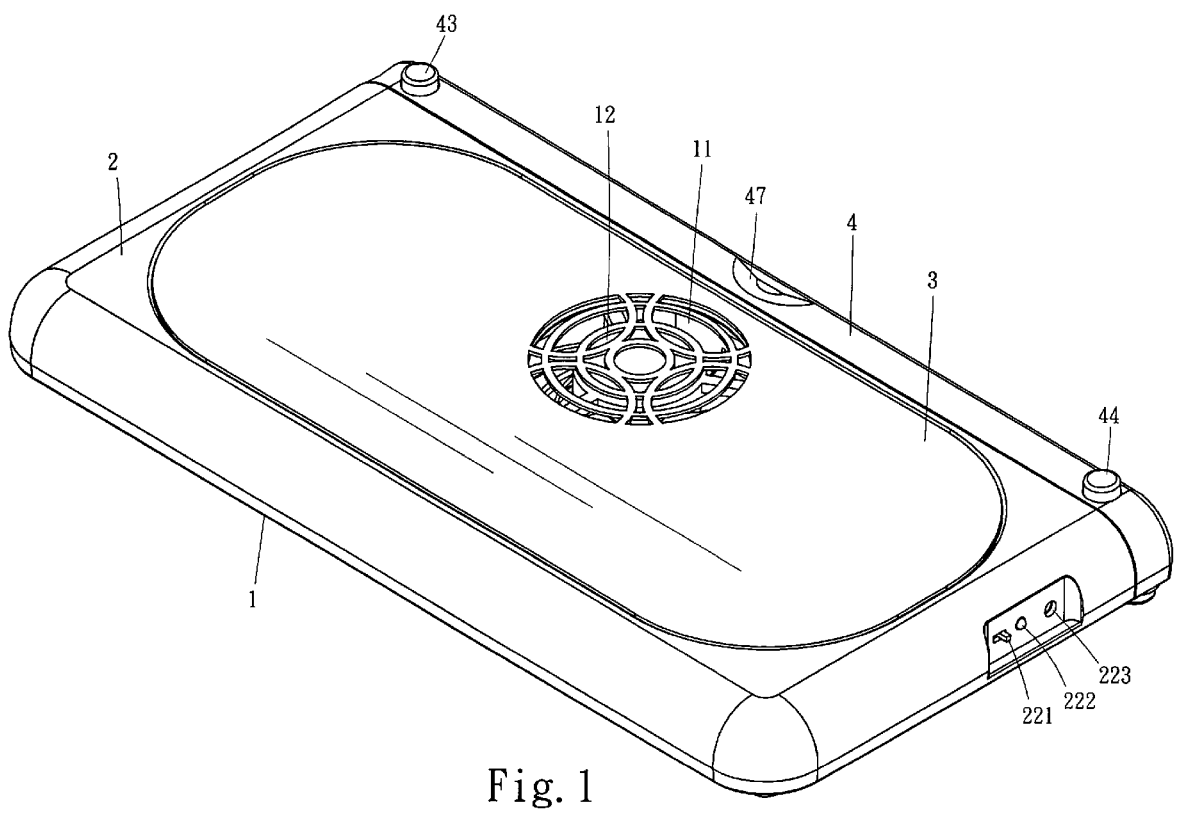
FIG. 1 is a three-dimensional view of the present invention.
Figure 2:
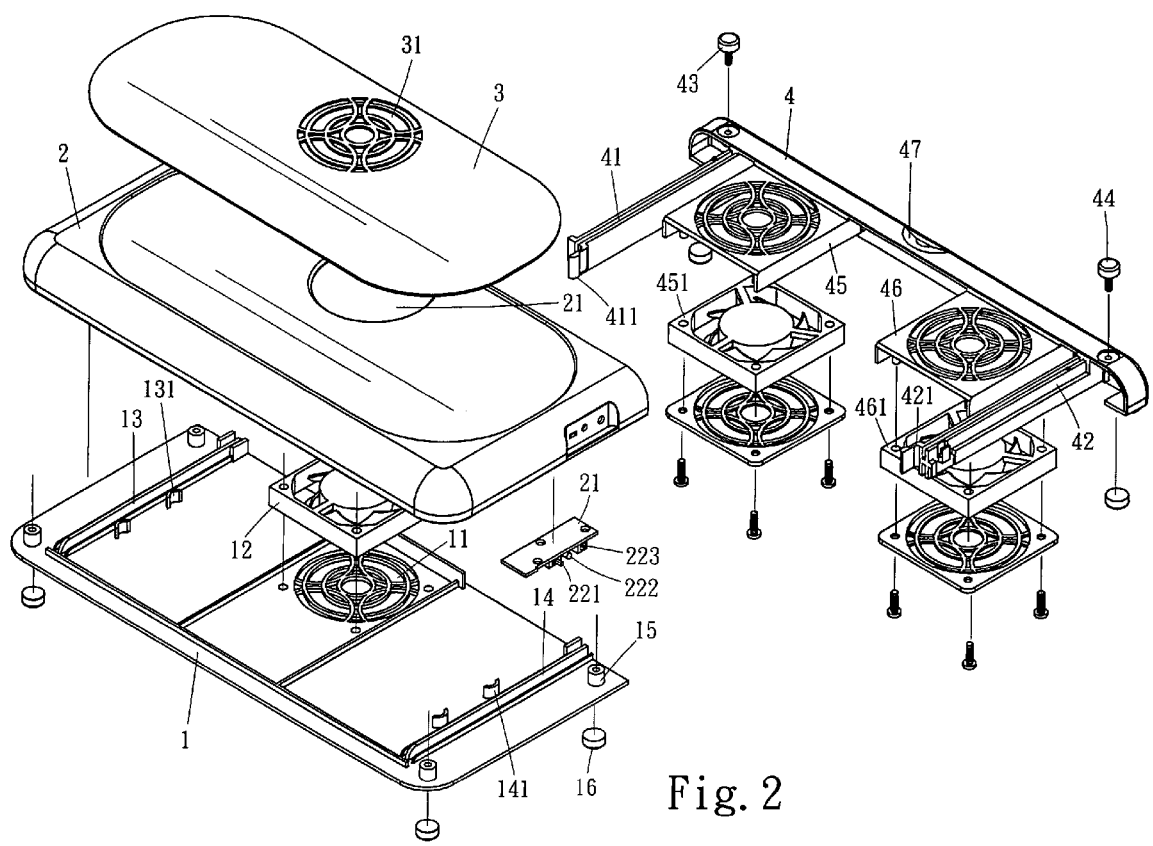
FIG. 2 is an exploded view of the main structure of the present invention.

As shown in FIGS. 1 and 2, the present invention provides an extendable and receivable heat-dissipating base set for notebooks including a bottom base 1, a cover 2, a stop pad 3, a receiving base 4 and heat-dissipating fans 12, 451, 461.

Refer to FIG. 2 showing an exploded view of the present invention, the bottom base 1 is preserved with a ventilation hole 11 thereon so as to correspond to one or more heat-dissipating fans 12 secured thereon. The two sides of the bottom base 1 provide symmetrical tracks 13, 14, one end of the tracks 13, 14 is provided with a stop block 131, 141 respectively. The corner of the bottom base 1 is provided with a screwing place 15.

Corresponding to the bottom base 1 is a cover 2 that preserves with a ventilation hole 21 corresponding to the heat-dissipating fan 12. One side of the cover 2 is secured with a circuit board 22 having a switch 221, an indicator 222, and a power input or a USB, IEEE1394/PS2 connector 223 so as to allow an operation from outside the cover 2. Also, the bottom base 1 and the cover 2 are assembled together by screwing a screw into the screwing place 15 of the bottom base 1. The back of the screwing place 15 of the bottom base 1 is provided with a gasket 16.

A stop pad 3 is secured on top of the cover 2, and a ventilation hole 31 corresponding to the heat-dissipating fan 12 on the stop pad 3 is preserved.

The two sides of the receiving base 4 are provided with extension arms 41, 42 respectively so as to correspond to the tracks 13, 14 of the bottom base 1. The front end of the extension arms 41, 42 each have a curved portion 411, 421. The extension arms 41, 42 can be placed in the tracks 13, 14 of the bottom base 1 so as to present the outward extending or inward receiving function of the receiving base 4. Through the contact of the curved portions 411, 421 and the stop blocks 131, 141 on the bottom base, the receiving base is secured.

The two ends in the front of the receiving 4 are provided with adjustable pads 43, 44 so that when the notebook is disposed on top of the heat-dissipating base set, the inclination of the notebook can be adjusted with the user's preference. In addition, a heat-dissipating fan frame 4546 is provided at an appropriate location inside the receiving base 4 so as to secure the heat-dissipating fans 451, 461 thereon. The center portion of the front end has a push trough 47.

By externally connecting the wires and the power input or the USB, IEEE1394/PS2 connector 223, the heat-dissipating fans 12, 451, 462 can be supplied with power.

Figure 3:
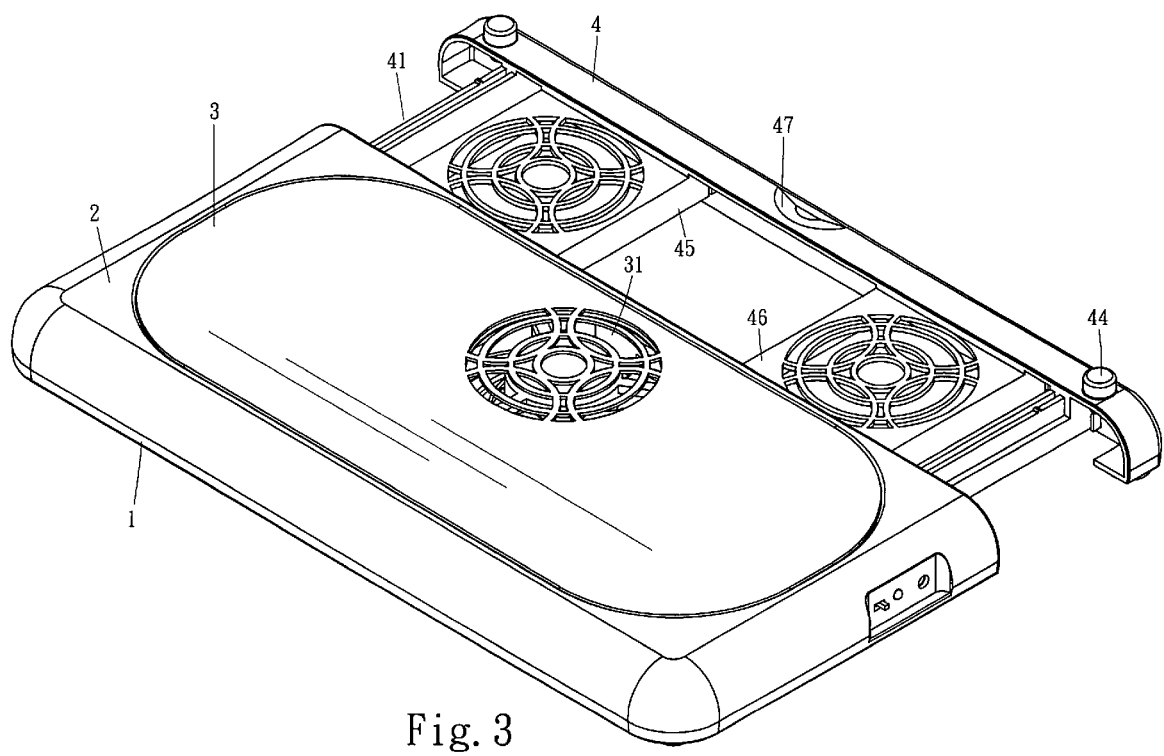
FIG. 3 is a three-dimensional view of an embodiment in accordance with the present invention.

Refer to FIG. 3 showing a three-dimensional view of an embodiment in accordance with the present invention. After the power is provided via the power input or the USB, IEEE1394/PS2 connector 223, the receiving base 4 can be pulled outward so as to provide assistance for heat dissipation for the notebook. Through the heat-dissipating fans 12, 451, 462 disposed on top of the bottom base 1 and the receiving base 4, heat can be effectively dissipated from the notebook disposed thereon. Or else, the receiving base 4 can be pushed inside the bottom base 1 and the cover 2 when not in use so as to reduce the overall size.

What is claimed is:

1. An extendable and receivable heat-dissipating base set for notebooks comprising: a bottom base, a cover, a stop pad, a receiving base, and a plurality of heat-dissipating fans, the plurality of heat-dissipating fans are disposed on both said bottom base and said receiving base of said heat-dissipating base set, and the receiving base being extendable and retractable, wherein one notebook of the notebooks is selectively disposed thereon for use when extended and the receiving base is retractable when the notebook is removed, wherein the stop pad is disposed on top of said cover, and said stop pad has a ventilation hole corresponding to a selected one of the plurality of heat-dissipating fans.

2. The extendable and receivable heat dissipating base set for notebooks according to claim 1, wherein an extendable and receivable structure having symmetrical tracks is located on said bottom base, and extension arms are located on two sides of the receiving base corresponding to said symmetrical tracks on said bottom base so as to allow said receiving base to present the extending or receiving function.

3. An extendable and receivable heat-dissipating base set for notebooks comprising: a bottom base, a cover, a stop pad, a receiving base, and a plurality of heat-dissipating fans, the plurality of heat-dissipating fans are disposed on both said bottom base and said receiving base of said heat-dissipating base set, and the receiving base being extendable and retractable, wherein one notebook of the notebooks is selectively disposed thereon for use when extended and the receiving base is retractable when the notebook is removed wherein one side of said cover is secured with a circuit board having a switch, an indicator, and an input device selected from a group consisting of a power input connector, a USB connector, and an IEEE 1394/PS2 connector thereon so as to operate from outside said cover.

4. An extendable and receivable heat-dissipating base set for notebooks comprising: a bottom base, a cover, a stop pad, a receiving base, and a plurality of heat-dissipating fans, the plurality of heat-dissipating fans are disposed on both said bottom base and said receiving base of said heat-dissipating base set, and the receiving base being extendable and retractable, wherein one notebook of the notebooks is selectively disposed thereon for use when extended and the receiving base is retractable when the notebook is removed, wherein an extendable and receivable structure having symmetrical tracks is located on said bottom base, and extension arms are located on two sides of the receiving base corresponding to said symmetrical tracks on said bottom base so as to allow said receiving base to present the extending or receiving function, wherein the front end of said extension arms has a curved portion respectively, so as to contact with a stop block of the bottom base presenting a secured position.

5. The extendable and receivable heat dissipating base set for notebooks according to claim 2, wherein adjustable pads are provided at the two ends of the front of the receiving base so as to adjust the inclination of the notebook disposed on top of said heat-dissipating base set when in use.

6. The extendable and receivable heat dissipating base set for notebooks according to claim 2, wherein a heat-dissipating fan frame is provided at an appropriate location inside said receiving base so as to secure at least one of the plurality of heat-dissipating fans thereon, said heat-dissipating fan frame having a push trough in the center of the front end.

* * * * *